(12) United States Patent
Wooldridge et al.

(10) Patent No.: US 10,645,111 B1
(45) Date of Patent: May 5, 2020

(54) BROWSING IDENTITY

(71) Applicant: Facebook, Inc., Menlo Park, CA (US)

(72) Inventors: Tobias Henry Wooldridge, Seattle, WA (US); Chaochao Cai, Bellevue, WA (US)

(73) Assignee: Facebook, Inc., Menlo Park, CA (US)

( * ) Notice: Subject to any disclaimer, the term of this patent is extended or adjusted under 35 U.S.C. 154(b) by 257 days.

(21) Appl. No.: 15/960,139

(22) Filed: Apr. 23, 2018

(51) Int. Cl.
*H04L 29/06* (2006.01)
*G06Q 30/02* (2012.01)
*G06Q 30/00* (2012.01)

(52) U.S. Cl.
CPC ..... *H04L 63/1425* (2013.01); *G06Q 30/0185* (2013.01); *G06Q 30/0277* (2013.01); *H04L 63/1483* (2013.01)

(58) Field of Classification Search
CPC ............ H04L 63/1425; H04L 63/1483; G06Q 30/0185; G06Q 30/0277
See application file for complete search history.

(56) References Cited

U.S. PATENT DOCUMENTS

| | | | | |
|---|---|---|---|---|
| 7,657,626 B1 * | 2/2010 | Zwicky | ................. | G06Q 30/02 705/51 |
| 8,561,184 B1 * | 10/2013 | Marsa | ..................... | H04L 67/22 726/22 |
| 2006/0212350 A1 * | 9/2006 | Ellis | .................. | G06Q 30/0242 705/14.41 |
| 2013/0226692 A1 * | 8/2013 | Kouladjie | ............. | G06Q 30/02 705/14.45 |
| 2017/0091809 A1 * | 3/2017 | Liu | ......................... | H04L 67/22 |
| 2018/0253755 A1 * | 9/2018 | Cheng | .................... | G06F 15/76 |
| 2019/0114649 A1 * | 4/2019 | Wang | ................. | H04L 63/1408 |
| 2019/0130440 A1 * | 5/2019 | Qiu | .................... | G06Q 30/0248 |

OTHER PUBLICATIONS

R. Mouawi, M. Awad, A. Chehab, I. H. E. Hajj and A. Kayssi, "Towards a Machine Learning Approach for Detecting Click Fraud in Mobile Advertizing," 2018 International Conference on Innovations in Information Technology (IIT), Al Ain, 2018, pp. 88-92. (Year: 2018).*

* cited by examiner

*Primary Examiner* — Kristine L Kincaid
*Assistant Examiner* — Alexander R Lapian
(74) *Attorney, Agent, or Firm* — Fenwick & West LLP

(57) ABSTRACT

An online system determines the likelihood of an interaction between a user and a content item being an invalid interaction. The online system receives an indication of an interaction of a client device with a content item. The online system identifies a device ID for the client device and determines whether the device ID is associated with one or more browser IDs. If the device ID is not associated with any browser ID, the received interaction is likely an invalid interaction. The online system may further determines the likelihood of an online publisher manufacturing interactions. The online system determines a number of invalid interactions and a number of valid interactions associated with the online publisher. The online system determines a ratio between the number of invalid and valid interactions. If the ratio is larger than a threshold value, the online system determines that the online publisher is likely manufacturing interactions.

20 Claims, 3 Drawing Sheets

BROWSING IDENTITY

BACKGROUND

This disclosure relates generally to determining the authenticity of the online activity of a client device.

Users typically interact with web pages using client devices such as a personal computer or a mobile phone. As the users interact with the web pages, statistics about the web traffic and the interactions of the users is tracked by the online systems.

Some entities may try to deceive an online system by running scripts to create online traffic and to mimic a user interacting with the online system. For example, an online publisher may receive compensation for publishing content provided by an online system. In order to increase the compensation to be received, the online publisher may generate online traffic (i.e., online impressions) to load pages of the online publisher that includes the content provided by the online system. Furthermore, the online publisher may further mimic clicks to the content provided by the online system (i.e., interactions). For example, the online publisher or an entity associated with the online system runs a script on a client device that repeatedly loads or sends loading request for content provided by the online publisher. The script may further include instructions to follow links provided with specific content items to mimic the interaction of a user with the specific content item. Thus, there is a need for a way verify the interaction by a client device with online system is organically coming from a user of the online system.

SUMMARY

An online system verifies the likelihood that an interaction was fabricated by an online publisher by analyzing a device identifier of a client device in an identifier graph. The identifier graph is generated by the online system as the online system is notified of interactions between a user device and either the online system or third party online systems. For example, the online system is notified of interactions performed by the client device by the activation of tracking pixels associated with different third party online systems. Additionally, users may reuse connection session when accessing the online system from multiple publishers. As such, a graph of interactions can be generated by linking a client device (or a client device identifier) with a set of interactions that can be inferred to be associated with a user of the client device. For instance, interactions that are associated with the same connection session can all be linked to the same user or client device. Typical users use client devices to interact with a variety of online systems and it is an irregular behavior for a client device to only interact with one online system. In particular, it is an irregular behavior for a client device to only interact with content that would result in a compensation or commission to be paid to an online publisher.

Furthermore, simply because an online publisher has suspicious interactions or interactions deemed to be invalid interactions by the online system does not mean that the online publisher is fabricating the interactions. For example, a user might have interacted with the online publisher with a brand new client device, and thus, the client device might not be associated with interactions in the identifier graph. Thus, to determine a likelihood the online publisher is fabricating the interactions, the online system determines the proportion of interactions that are suspicious or identified as invalid interactions compared to the total number of interactions or the number of interactions that are identified as being valid interactions. If the proportion of interactions that are suspicious is larger than a threshold, the online system determines that the online publisher is likely fabricating the interactions.

More specifically, the online system determines the likelihood of an interaction between a user and a content item being an invalid interaction. The online system receives an indication of an interaction of a client device with a content item presented by an online publisher, the content item provided by an online service different than the online publisher. The online system identifies a device ID for the client device and determines whether the device ID is associated with one or more browser IDs. The determination whether the device ID is associated with one or more browser IDs may be performed by identifying edges that connect the device ID with browser IDs in an identifier graph. In some embodiments, the identifier graph is generated by connecting browser IDs indicative of an interaction between a client device and an online publisher to a device ID associated with a session ID responsive to receiving an indication the online publisher was interacted with. If the device ID is not associated with any other browser IDs and the device ID is not associated with other interactions at other non-publisher systems, the received interaction is likely an invalid interaction. The online system may further determine the likelihood of an online publisher manufacturing interactions by identifying more generally the portion of interactions that appear likely to be invalid. The online system determines a number of invalid interactions and a number of valid interactions associated with the online publisher across many devices. The online system determines a ratio between the number of invalid and valid interactions. If the ratio is larger than a threshold value, the online system determines that the online publisher is likely manufacturing interactions.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
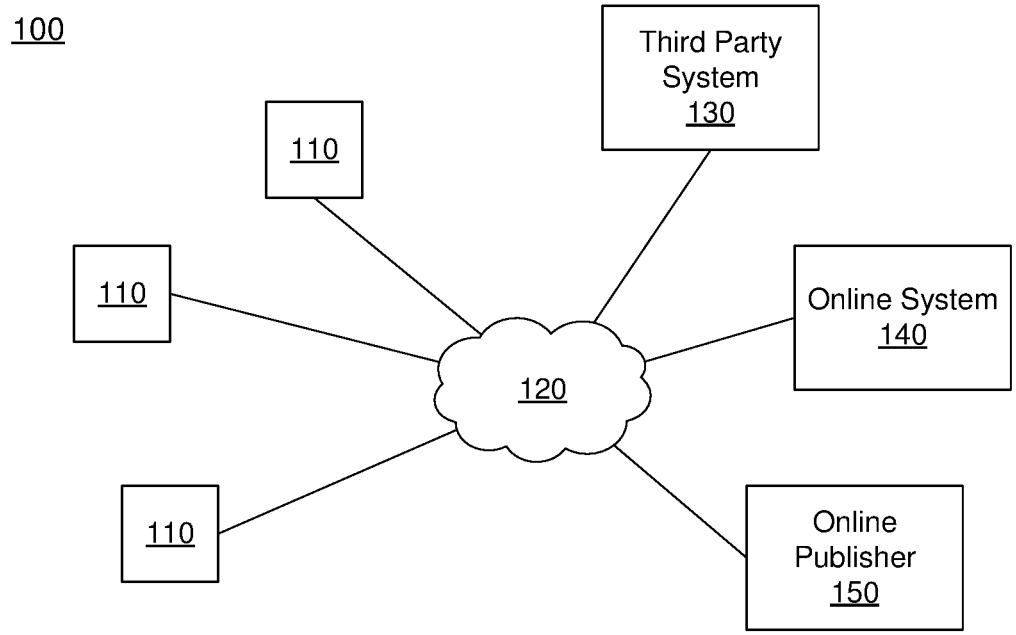
FIG. 1 is a block diagram of a system environment in which an online system operates, in accordance with an embodiment.

FIG. 1 is a block diagram of a system environment 100 for an online system 140, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

One or more online publishers 150 are further coupled to the network 120 for communicating with the online system 140. The online publisher 150 distributes content provided by the online system. For example, the online publisher 150 embeds advertisements provided by the online system 140 into pages that are distributed by the online publisher. In some embodiments, the online system compensates the online publisher for embedding the content provided by the online system 140 into pages distributed by the online publisher 150.

Figure 2:
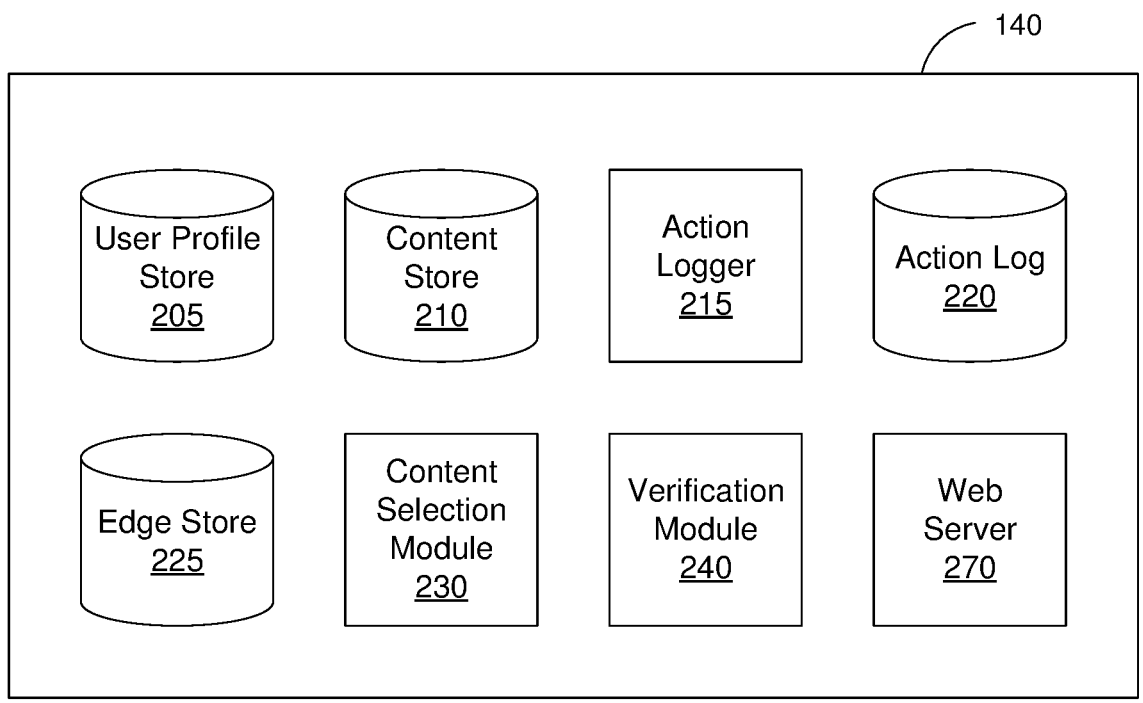
FIG. 2 is a block diagram of an online system, in accordance with an embodiment.

FIG. 2 is a block diagram of an architecture of the online system 140, in accordance with an embodiment. The online system 140 shown in FIG. 2 includes a user profile store 205, a content store 210, an action logger 215, an action log 220, an edge store 225, a content selection module 230, a verification module 240, and a web server 270. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups, or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 identifies content to be present to users of the online system 150. Furthermore, the content selection system 230 identifies content to provide to an online publisher 150 for presentation to the users of the online publisher 150. In some embodiments, the content selection module 230 identifies content based on characteristics of the users the content will be presented to. For example, the content selection module 230 determines a score for multiple content items based on the characteristics of each content item and the characteristics of a user, and ranks the content items based on the determined scores. The 26295/35070/US content selection module 230 then selects a top threshold number of content items to be presented to the user.

The content verification module 240 verifies the authenticity of the interactions generated at the online publisher 150. The online publisher 150 may include a script to notify the online system of activity performed by a user in the third party publisher 150. The script may cause a tracking pixel to be fired in the online system 140 in response to specific action being taken by users of the online publisher 150. For example, if a content item provided by the online system is interacted with (e.g., clicked) by the user, the interaction with the content item triggers a specific tracking pixel to be activated in the online system, thus, notifying the online system that the user has interacted with the content item.

When the online system 140 detects an interaction with a content item provided to an online publisher, the online system 140 determines whether the detected interaction is fraudulent. For example, the online publisher may be running a script to give the appearance that a large number of users are interacting with the content items provided by the online system. The content verification module 240 and the process for determining the authenticity of an interaction is described in more detail below in conjunction with FIG. 3.

The verification module 240 further generates an identifier (ID) graph. The ID graph is a graph that links client identifiers (client IDs) to one or more browser identifiers (browser IDs). The ID graph is generated by identifying when a user is browsing the internet and what device the user is browsing the internet with. For example, when a cookie is generated for a browsing session of a client device, the verification module 240 may create an edge in the ID graph between the client device or device ID of the client device and the generated cookie or a browser ID associated with the cookie. Thus, as the user visits different third party systems 130 or the online system 140, edges in the ID graph between the client device and multiple cookies is created.

As such, a typical person would have a client device that is connected to multiple cookies or browser IDs. The multiple connections are organically generated over time as the user uses the client device to visit different web sites. In some instances, the person accessing the different web sites does not have user credentials at the sites, but nonetheless may access various web sites, thus creating a variety of cookies or browser IDs from those sites. In contrast, a client device that an entity uses to generate non-organic interactions with a specific web site will likely not have many edges to cookies or browser IDs in the ID graph. As used herein, non-organic interactions are interactions that do not represent typical, normal browsing by a person. That is, interactions that are artificially fabricated. For example, a non-organic interaction is an interaction between a client device and a web site, where the user of the client device is not interested in the contents of the web site, but instead, the user of the client device is interested in the associated with the web site being interacted with (e.g., a financial gain for the user each time the web site is interacted with). In some embodiments, the non-organic interactions are generated by a script that runs automatically on the client device.

The web server 270 links the online system 140 via the network 120 to the one or more client devices 110, as well as to the one or more third party systems 130. The web server 270 serves web pages, as well as other content, such as JAVA®, FLASH®, XML and so forth. The web server 270 may receive and route messages between the online system 140 and the client device 110, for example, instant messages, queued messages (e.g., email), text messages, short message service (SMS) messages, or messages sent using any other suitable messaging technique. A user may send a request to the web server 270 to upload information (e.g., images or videos) that are stored in the content store 210. Additionally, the web server 270 may provide application programming interface (API) functionality to send data directly to native client device operating systems, such as IOS®, ANDROID™, or BlackberryOS.

User Interaction Verification

Figure 3:
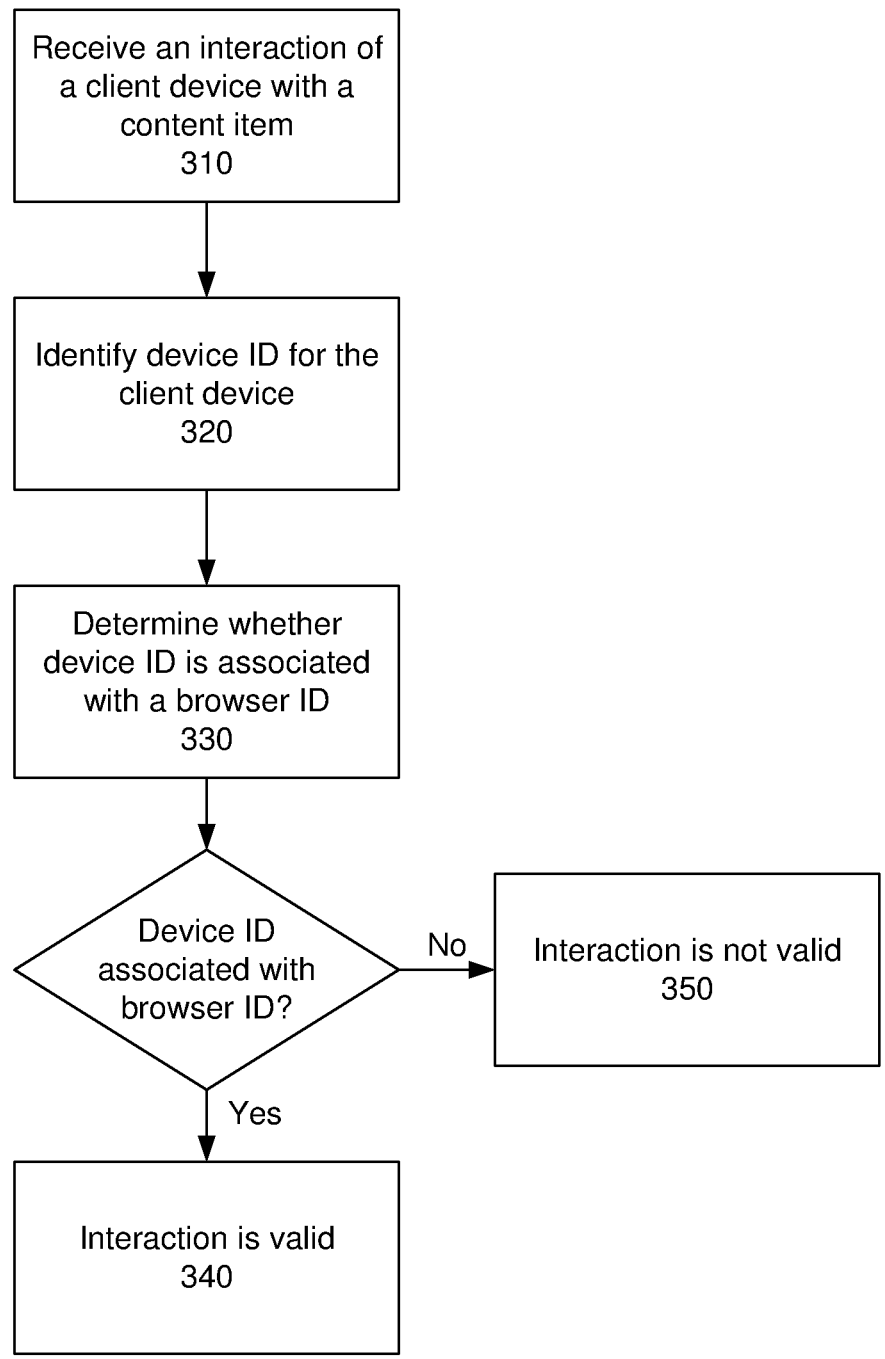
FIG. 3 is a flow diagram of a process for identifying fraudulent interactions, in accordance with an embodiment.

FIG. 3 is a flow diagram of a process for identifying fraudulent interactions, according to one embodiment. The online system 140 receives 310 a notification that an interaction between a user and a content item occurred in an online publisher 150. For example, the online system 140 receives a notification in the form of a tracking pixel associated with the content item being activated or fired. That is, when the user interacts with the content item, a script associated with the content item causes the client device of the user to send a request to a specific web address (i.e., a web address associated with the tracking pixel) that the online system 140 can monitor. As such, when the client device of the user sends the request to the specific web address, the online system treats the request as a notification that the user has interacted with the content item.

Additionally, users may reuse a connection session when accessing the online system from multiple publishers. That is, when communication is first established between a client device of a user and the online system, the browser of the client device of the user opens a new socket to communicate with the online system. After the session has been established between the client device and the online system, the client device may send requests to the online system and receive data from the online system. In some embodiments, the client device uses the same session or socket when communicating with the online system from different publishers. If the client device provides different browser IDs when communicating from different publishers, but using the same connection session, the online system may associate the different browser IDs provided through the same connection session with the same device ID.

For example, a first publisher may instruct a client device to retrieve data from the online system. To retrieve the data, the client device creates a new connection session with the online system and sends a request for the data using the connection session. The request sent by the client device to the online system may include a first browser ID. Subsequently, the user of the client device may try to access a second publisher, different from the first publisher. The second publisher then may instruct the client device to retrieve data from the online system. If the connection session has not timed out, the client device may send a second request to the online system using the same connection session. The second request may include a second browser ID, different than the first browser ID. In this example, the online system is able to associate the first browser ID and the second browser ID with the same device ID as both browser IDs were sent to the online system via the same connection session.

The verification module 240 identifies 320 a device ID for the client device associated with the interaction. In some embodiments, the device ID is received together with the notification that the interaction between the user and a content item has occurred. In some embodiments, the device ID is an identifier that is specifically assigned to a client device, such as, a media access control (MAC) address.

The verification module 240 determines 330 whether the device ID is associated with a browser ID. In some embodiments, the browser ID is generated when a client device interacts with the online system 140. In other embodiments, the browser ID is generated when the client device interacts with third party systems 130. As used herein, the browser ID is data stored by a client device in a local storage of the client device and defines an identifier associated with an access event initiated by the client device. In certain embodiments, the browser ID is stored as one or more cookies in the local storage of the client device. Additional description of a browser ID can be found in U.S. patent application Ser. No.

15/922,826, file May 9, 2017, the contents of which is incorporated by reference in its entirety.

In some embodiments, the verification module 240 determines 330 whether the device ID is associated with at least a set number of browser IDs from different web sites. For instance, the verification module 240 determines 330 whether the device ID is associated with at least two browser IDs, or whether the device ID is associate with a browser IDs that are not related to the online publisher 150. If the device ID is associated with at least the set number of browser IDs, the verification module 240 determines that the client device associated with the client ID is likely generation non-organic interactions.

In other embodiments, the verification module 240 determines a score indicative of the likelihood the client device associated with the client ID is generating non-organic interactions based on the number of browser IDs the client ID is associated with, and the web site the browser IDs are associated with. The verification module 240 may then set a threshold value for the score to classify interactions initiated by the client device as non-organic interactions.

Figure 4:
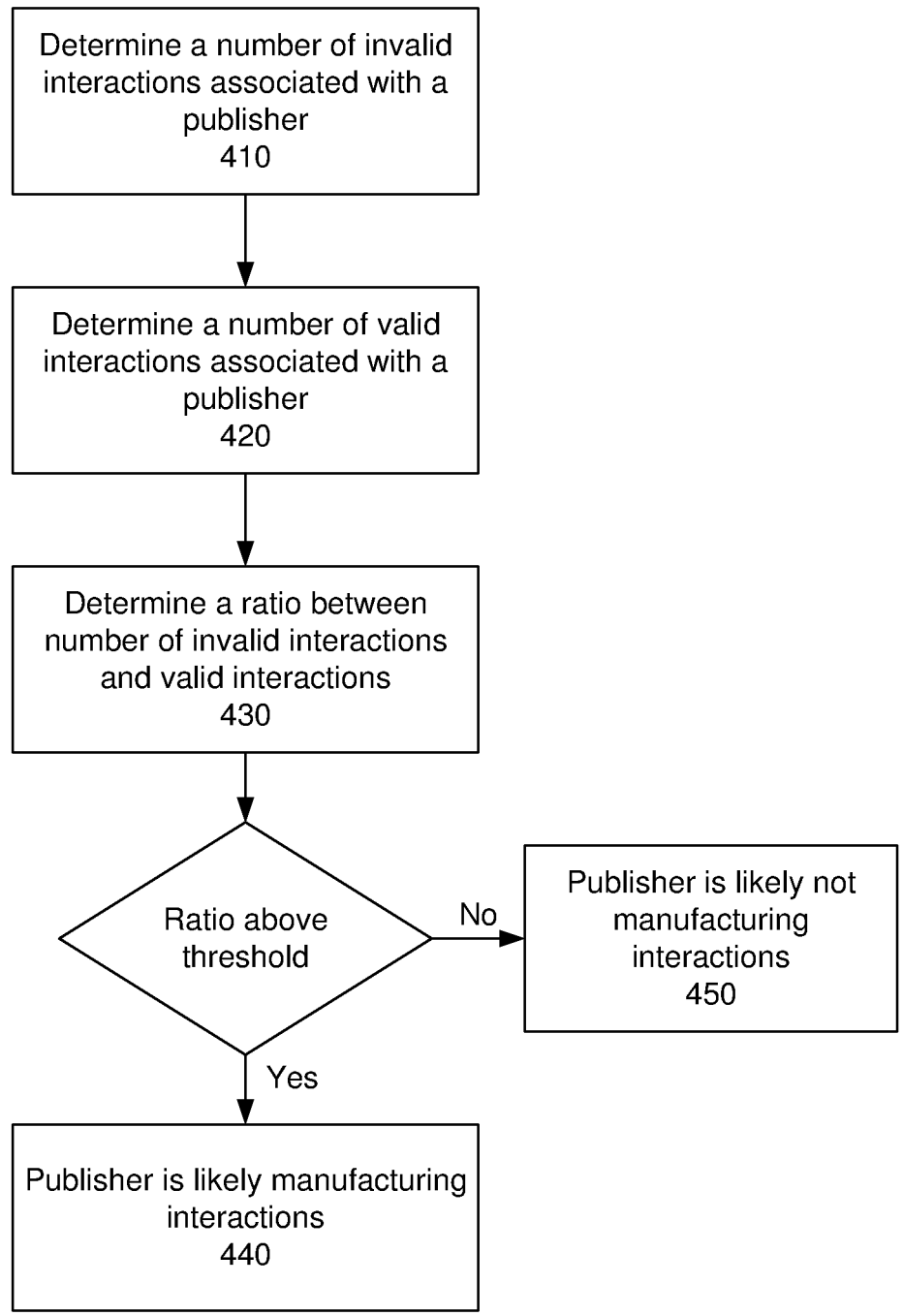
FIG. 4 illustrates a flow diagram of a process for determining whether a publisher is manufacturing interactions, in accordance with an embodiment.

FIG. 4 illustrates a flow diagram of a process for determining whether a publisher is manufacturing interactions, according to one embodiment. The verification module 240 determines 410 a number of invalid interactions that were received and are associated with the publisher. The verification module 240 further determines 420 a number of valid interactions associated with the publisher.

The verification module 240 then determines 430 a ratio based on the determined number of invalid interactions and the determined number of valid interactions associated with the publisher. For example, the verification module 240 determines a ratio R as $$R = \frac{\text{number of invalid interactions}}{\text{number of valid interactions}}$$

In other embodiments, the verification module 240 determines the ratio R as $$R = \frac{\text{number of invalid interactions}}{\text{total number of interactions}}$$

$$R = \frac{\text{number of invalid interactions}}{\text{number of valid interactions} + \text{number of invalid interactions}}$$

The determined ratio is then compared to a threshold value. If the ratio is above the threshold, the verification module 240 determines 440 that the publisher is likely manufacturing interactions. Otherwise, if the ratio is below the threshold, the verification module 240 determines 450 that the publisher is likely not manufacturing interactions.

In some embodiments, the verification module 240 determines the ratio R for all publishers, or all publishers with a specific type or set of characteristics (e.g., online forums for body builders), and identifies a top percentile of publishers as likely manufacturing interactions. In other embodiments, the verification module 240 identifies outlies with a ratio R that is larger than a set number of standard deviations from the mean value of the ratio R for all publishers.

The online system 140 may use the determination of whether a publisher is manufacturing interactions to adjust the compensation of the publisher 150 for presenting content items to users of the publisher. In some embodiments, if the online system 140 determines that the publisher 150 is manufacturing interactions, the online system 140 can stop sending content items to the publisher 150.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving an indication of an interaction of a client device with a content item presented by an online publisher, the content item provided by an online service different than the online publisher;
identifying a device identifier for the client device;
determining whether the device identifier is associated with one or more browser identifiers by identifying edges that connect the device identifier with the one or more browser identifiers in an identifier graph, the identifier graph generated by connecting the one or more browser identifiers indicative of an interaction between a client device and an online publisher to a device identifier associated with a session identifier responsive to receiving an indication the online publisher was interacted with, the received indication including the session identifier;
responsive to determining that the device identifier is not associated with the one or more browser identifiers:
identifying the interaction as an invalid interaction; and
responsive to identifying the interaction as an invalid interaction:
determining a number of invalid interactions associated with the online publisher,
determining a number of valid interactions associated with the online publisher,
determining a ratio between the number of invalid interactions associated with the online publisher and the number of valid interactions associated with the online publisher,
comparing the ratio to a first threshold value, and
responsive to the ratio being larger than the first threshold value, determining that the online publisher is manufacturing interactions.

2. The method of claim 1, further comprising:
determining a number of browser identifiers the device identifier is associated with; and
responsive to determining that the number of browser identifiers the device identifier is associated with is lower than a second threshold:
identifying the interaction as an invalid interaction.

3. The method of claim 1, wherein the indication of the interaction of the client device with the content item is received responsive to a tracking pixel associated with the content item being activated.

4. The method of claim 1, further comprising:
providing the content item to a third party online publisher, the content item including a script that activates a tracking pixel in response to a user interacting with the content item.

5. The method of claim 1, further comprising:
responsive to receiving an interaction originated from the client device:
generating a browser identifier for the interaction, and
associating the browser identifier with the device identifier of the client device.

6. The method of claim 1, further comprising:
responsive to receiving an indication of an interaction in a third party web site originated from the client device:
generating a browser identifier for the interaction in the third party web site, and
associating the browser identifier for the interaction in the third party web site with the device identifier of the client device.

7. The method of claim 6, wherein the browser identifier is associated with a cookie generated for the interaction of the client device with the third party web site.

8. A non-transitory computer readable storage medium configured to store instruction, the instruction when executed by a processor, cause the processor to:
receive an indication of an interaction of a client device with a content item presented by an online publisher, the content item provided by an online service different than the online publisher;
identify a device identifier for the client device;
determine whether the device identifier is associated with one or more browser identifiers by identifying edges that connect the device identifier with the one or more browser identifiers in an identifier graph, the identifier graph generated by connecting the one or more browser identifiers indicative of an interaction between a client device and an online publisher to a device identifier associated with a session identifier responsive to receiving an indication the online publisher was interacted with, the received indication including the session identifier;
responsive to determining that the device identifier is not associated with the one or more browser identifiers:
identify the interaction as an invalid interaction; and
responsive to identifying the interaction as an invalid interaction:
determine a number of invalid associated with the online publisher,
determine a number of valid interactions associated with the online publisher,
determine a ratio between the number of invalid interactions associated with the online publisher and the number of valid interactions associated with the online publisher,
compare the ratio to a first threshold value, and
responsive to the ratio being larger than the first threshold value, determine that the online publisher is manufacturing interactions.

9. The non-transitory computer readable storage medium of claim 8, wherein the instructions further cause the processor to:
determine a number of browser identifiers the device identifier is associated with; and
responsive to determining that the number of browser identifiers the device identifier is associated with is lower than a second threshold:
identify the interaction as an invalid interaction.

10. The non-transitory computer readable storage medium of claim 8, wherein the indication of the interaction of the client device with the content item is received responsive to a tracking pixel associated with the content item being activated.

11. The non-transitory computer readable storage medium of claim 8, wherein the instructions further cause the processor to:
provide the content item to a third party online publisher, the content item including a script that activates a tracking pixel in response to a user interacting with the content item.

12. The non-transitory computer readable storage medium of claim 8, wherein the instructions further cause the processor to:

responsive to receiving an interaction originated from the client device:
 generate a browser identifier for the interaction, and
 associate the browser identifier with the device identifier of the client device.

13. The non-transitory computer readable storage medium of claim 8, wherein the instructions further cause the processor to:
responsive to receiving an indication of an interaction in a third party web site originated from the client device:
 generate a browser identifier for the interaction in the third party web site, and
 associate the browser identifier for the interaction in the third party web site with the device identifier of the client device.

14. The non-transitory computer readable storage medium of claim 8, wherein the browser identifier is associated with a cookie generated for the interaction of the client device with a third party web site.

15. A system comprising:
a processor; and
a non-transitory computer readable storage medium configured to store instructions, the instruction when executed by the processor cause the processor to:
receiving an indication of an interaction of a client device with a content item presented by an online publisher, the content item provided by an online service different than the online publisher;
identifying a device identifier for the client device;
determining whether the device identifier is associated with one or more browser identifiers by identifying edges that connect the device identifier with the one or more browser identifiers in an identifier graph, the identifier graph generated by connecting the one or more browser identifiers indicative of an interaction between a client device and an online publisher to a device identifier associated with a session identifier responsive to receiving an indication the online publisher was interacted with, the received indication including the session identifier; and
responsive to determining that the device identifier is not associated with the one or more browser identifiers:
 identifying the interaction as an invalid interaction
responsive to identifying the interaction as an invalid interaction:
 determining a number of invalid interactions associated with the online publisher,
 determining a number of valid interactions associated with the online publisher,
 determining a ratio between the number of invalid interactions associated with the online publisher and the number of valid interactions associated with the online publisher,
 comparing the ratio to a first threshold value, and
 responsive to the ratio being larger than the first threshold value, determining that the online publisher is manufacturing interactions.

16. The system of claim 15, wherein the instructions further cause the processor to:
determine a number of browser identifiers the device identifier is associated with; and
responsive to determining that the number of browser identifiers the device identifier is associated with is lower than a second threshold:
 identify the interaction as an invalid interaction.

17. The system of claim 15, wherein the instructions further cause the processor to:
provide the content item to a third party online publisher, the content item including a script that activates a tracking pixel in response to a user interacting with the content item.

18. The system of claim 15, wherein the instructions further cause the processor to:
responsive to receiving an interaction originated from the client device:
 generate a browser identifier for the interaction, and
 associate the browser identifier with the device identifier of the client device.

19. The system of claim 15, wherein the instructions further cause the processor to:
responsive to receiving an indication of an interaction in a third party web site originated from the client device:
 generate a browser identifier for the interaction in the third party web site, and
 associate the browser identifier for the interaction in the third party web site with the device identifier of the client device.

20. The system of claim 15, wherein the browser identifier is associated with a cookie generated for the interaction of the client device with a third party web site.

* * * * *

UNITED STATES PATENT AND TRADEMARK OFFICE
CERTIFICATE OF CORRECTION

PATENT NO. : 10,645,111 B1
APPLICATION NO. : 15/960139
DATED : May 5, 2020
INVENTOR(S) : Tobias Henry Wooldridge and Chaochao Cai Page 1 of 1

It is certified that error appears in the above-identified patent and that said Letters Patent is hereby corrected as shown below:

In the Claims

Column 12, Line 30, In Claim 8, after "invalid", insert --interactions--

Signed and Sealed this
Fifteenth Day of December, 2020

Andrei Iancu
*Director of the United States Patent and Trademark Office*